(12) United States Patent
Koskinen et al.

(10) Patent No.: US 7,869,787 B2
(45) Date of Patent: Jan. 11, 2011

(54) CHARGING FOR AN IP BASED COMMUNICATION SYSTEM

(75) Inventors: Juha-Pekka Koskinen, Hameenlinna (FI); Juha R Vallinen, Tampere (FI); Marco Stura, Rueglio (IT); Elena Lialiamou, Piraeus (GR); Anne Narhi, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/524,055

(22) PCT Filed: Aug. 9, 2002

(86) PCT No.: PCT/IB02/03871

§ 371 (c)(1),
(2), (4) Date: Mar. 9, 2005

(87) PCT Pub. No.: WO2004/015975

PCT Pub. Date: Feb. 19, 2004

(65) Prior Publication Data

US 2005/0235052 A1 Oct. 20, 2005

(51) Int. Cl.
*H04M 11/00* (2006.01)
(52) U.S. Cl. .................. 455/406; 455/405; 455/407; 455/408; 455/409
(58) Field of Classification Search ............. 455/406, 455/408, 407, 409, 405; 370/338, 356
See application file for complete search history.

(56) References Cited

U.S. PATENT DOCUMENTS

| 6,201,957 | B1* | 3/2001 | Son et al. ............... 455/406 |
| 6,343,284 | B1* | 1/2002 | Ishikawa et al. ........... 705/67 |
| 6,829,473 | B2* | 12/2004 | Raman et al. ............ 455/406 |
| 6,947,724 | B2* | 9/2005 | Chaney .................. 455/408 |
| 6,973,309 | B1* | 12/2005 | Rygula et al. ............ 455/436 |
| 7,200,381 | B2* | 4/2007 | Halkosaari et al. ........ 455/405 |
| 7,471,634 | B1* | 12/2008 | Wenzel et al. ............ 370/241 |
| 2001/0049656 | A1 | 12/2001 | Halkosaari et al. |
| 2002/0191597 | A1* | 12/2002 | Lundstrom .............. 370/356 |
| 2004/0105413 | A1* | 6/2004 | Menon et al. ............ 370/338 |
| 2004/0147245 | A1* | 7/2004 | Kastelewicz et al. ....... 455/406 |
| 2005/0210141 | A1* | 9/2005 | Oyama et al. ............ 709/228 |

FOREIGN PATENT DOCUMENTS

| WO | WO 01/63883 A2 | 8/2001 |
| WO | WO 02/052833 A2 | 7/2002 |
| WO | WO 02/052834 A1 | 7/2002 |

OTHER PUBLICATIONS

Sebastian Zander "Evaluation of Diameter Protocol Against IPFIX Requirements"; Sep. 2002; pp. 1-12.

* cited by examiner

*Primary Examiner*—Charles N Appiah
*Assistant Examiner*—Olumide T Ajibade Akonai
(74) *Attorney, Agent, or Firm*—Squire, Sanders & Dempsey L.L.P.

(57) ABSTRACT

There is disclosed a method for charging for services in an IP based communication system, comprising: establishing an accounting session between a network element and a charging function for the session; and initiating a change in the accounting session at the charging function.

24 Claims, 3 Drawing Sheets

CHARGING FOR AN IP BASED COMMUNICATION SYSTEM

FIELD OF THE INVENTION

The present invention relates to the provision of charging services in Internet protocol networks, and particularly to the updating of accounting sessions during charging.

BACKGROUND OF THE INVENTION

The provision of centralised charging functionality is likely to be a key issue in all-IP (Internet protocol) networks, such as mobile communications networks in which a packet switched cellular network provides access for mobile users to services provided by external IP networks.

Diameter is an IETF protocol that has been specifically designed for the Internet infrastructure. Diameter unifies authentication, authorization and accounting (AAA) transactions. The accounting related extension of the base Diameter protocol is likely to be used in networks which are all-IP (Internet Protocol) based for charging purposes.

An essential feature of the provision of charging functions in all-IP based networks is that on-line charging must be provided for, which may require for the information associated with an accounting session to be updated dynamically. However, the existing Diameter protocol does not specifically allow for on-line charging capability.

It is an object of the present invention to provide an improved technique for charging in IP networks, which addresses one or all of the above-stated problems.

SUMMARY OF THE INVENTION

According to the present invention there is provided a method for charging for services in an IP based communication system, comprising: establishing an accounting session between a network element and a charging function for the session; and initiating a change in the accounting session at the charging function.

The step of initiating a change in the accounting session may comprise transmitting a request to update the accounting session from the charging function to the network element.

The request may be an update accounting request message. Responsive to the request the network element may implement a change in the charging of the accounting session.

Responsive to the request the network element may transmit an acknowledgement to the charging function. The acknowledgement may be an update accounting acknowledgement message.

The network element may be a controller of the communications session.

The step of establishing an accounting session may include establishing an accounting session between the charging function and a further network element.

The method may further comprise the step of establishing an accounting session between an application for the session and the charging function.

The method may further comprise the step of establishing an accounting session between a control function for the session and the charging function.

The change in the accounting session between the network element controlling the session and the charging function may be responsive to a change in the at least one further accounting session.

The accounting session may be associated with a pre-paid charging function.

The IP based communication system may support a Diameter IP protocol.

According to a further aspect of the present invention there is provided an element for monitoring charging in an IP based communication system, comprising: means for establishing an accounting session with an application; means for informing a network element controlling an associated communication session of the accounting session; and means for initiating a change in the accounting session.

The means for initiating a change in the accounting session may include means for transmitting a request to update the accounting session.

The request may be an update accounting request message.

A change in the charging of the accounting session may be implemented responsive to the request.

Responsive to the request the network element may transmit an acknowledgement to the charging function.

The acknowledgement may be an update accounting acknowledgement message.

The network element may be a controller of the communications session.

The communication system may support a Diameter IP protocol.

The request signal may be transferred using a Diameter IP protocol. The acknowledgement signal may be transferred using a Diameter IP protocol.

According to a still further aspect of the present invention there is provided a communication system in which charging for the provision of services is implemented in a session, the system comprising: a network element for controlling the session; an application for the session; a control function for the session; and a charging function, wherein at least one accounting session is established between the charging function and at least one of the network element, the application and the control function, wherein the charging function is adapted to initiate a change in the at least one accounting session.

The charging is preferably pre-paid charging.

There is preferably provided a plurality of accounting sessions, wherein the charging function initiates a change in one accounting session responsive to a change in another accounting session.

In summary, therefore, in embodiments the present invention provides an enhancement to the Diameter IP protocol's on-line charging capability, by specifying a new message pair for charging information updating purposes. This new message pair is, in a preferred embodiment, a charging function server initiated update-accounting-request, and a corresponding update-accounting-answer.

Advantageously, the present invention enables effective on-line charging in all-IP networks. The charging function server is adapted to update an accounting session dynamically. Especially advantageously, the Diameter protocol is adapted to enable more flexible charging functionality.

The invention thus provides for an operator to be able to use the Diameter protocol in a flexible way.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

The present invention is described herein with reference to a particular illustrative embodiment. However, such embodiment is presented for the purposes of illustrating the present invention, and does not limit the scope thereof.

In particular, the present invention is described herein with reference to a particular example of a UMTS network supporting user equipment, such as a mobile station, and providing connections for the user equipment to external IP networks.

Figure 1:
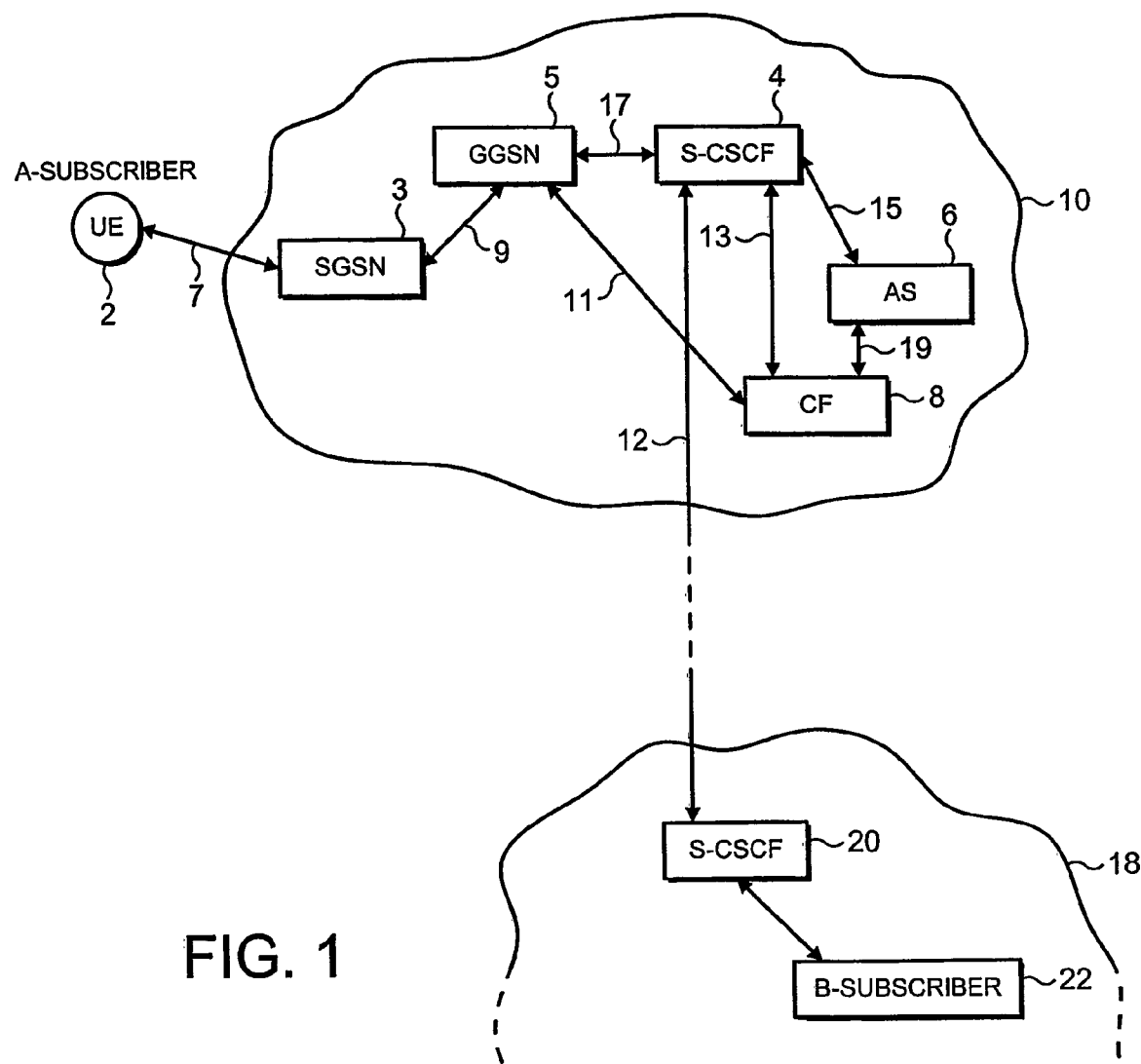
FIG. 1 illustrates the main network elements in an example implementation of the present invention.

Referring to FIG. 1, there is illustrated the main elements of a UMTS network implementing an all-IP Diameter protocol system for the purposes of describing the present invention. In FIG. 1 only those elements of a UMTS system necessary for supporting the Diameter protocol charging in accordance with the present invention are illustrated. The full implementation of such a system will be apparent to one skilled in the art.

FIG. 1 illustrates generally a UMTS network infrastructure 10 including a serving GPRS support node (SGSN) 3, a gateway GPRS support node (GGSN) 5, a serving call state control function (S-CSCF) 4, a charging framework (CF) 8 preferably including a combined charging collector function (CCF) and online charging system (OCS), and an application server (AS) 6. The SGSN 3 provides access over the radio access network 7 for a user equipment 2 to the UMTS network 10. The SGSN 3 is connected to the GGSN 5 by a link 9. The GGSN is connected to the S-CSCF 4 by a link 17. The SGSN and the GGSN represent the packet domain of the network 10 of FIG. 1. They provide control and transfer of packets between the UE 2 and applications provided in the network 10 or in other external networks.

The S-CSCF 4 supports a call session for the user equipment, such as user equipment 2, connected in the UMTS network 10. The CF 8 provides the centralized charging function for on-line and off-line charging, and is connected to the S-CSCF 4 by communication link 13. The CF 8 is additionally connected to the GGSN 5 and the AS 6 by respective communication links 11 and 19. The AS 6 is connected to the S-CSCF 4 by communication links 15.

It should be noted that the elements and connections shown in FIG. 1 are for the purposes of illustrating an exemplary embodiment of the invention only, and one skilled in the art will fully understand the implementation of a UMTS network 10.

The S-CSCF 4 additionally has a connection 12 to an IP network or element of an IP network external to the UMTS network 10, as described further hereinbelow. In particular, the connection 12 connects to a service provider or terminating part with which the user equipment 2 establishes a session.

The UMTS network provides access to other, external IP services or networks for the user equipment 2. For the purposes of the present example, it is assumed that a call session is to be established between the user equipment 2, and a B-subscriber 22 in a further IP network 18. The further IP network 18 supports the call session for the E-subscriber 22 with a serving call state control function (S-CSCF) 20. For the purposes of this example, as the initiating caller the user equipment 2 is considered to be an A-subscriber. For the purposes of supporting the call session, the connection 12 is between the respective S-CSCFs of the respective subscribers.

The B-subscriber may, for example, be a further user equipment or a service provided by a third party.

The protocol interfaces for the various IP network elements of FIG. 1 may be implementation dependent. In a preferred embodiment the S-CSCF 4 is connected to the AS 6 via an ISC interface. The ISC interface may, for example, be a session initiation protocol (SIP) interface. The CF 8 is preferably connected to the S-CSCF 4 via a Diameter protocol represented. The CF 8 is preferably connected to the AS 6 via a diameter protocol.

Figure 2:
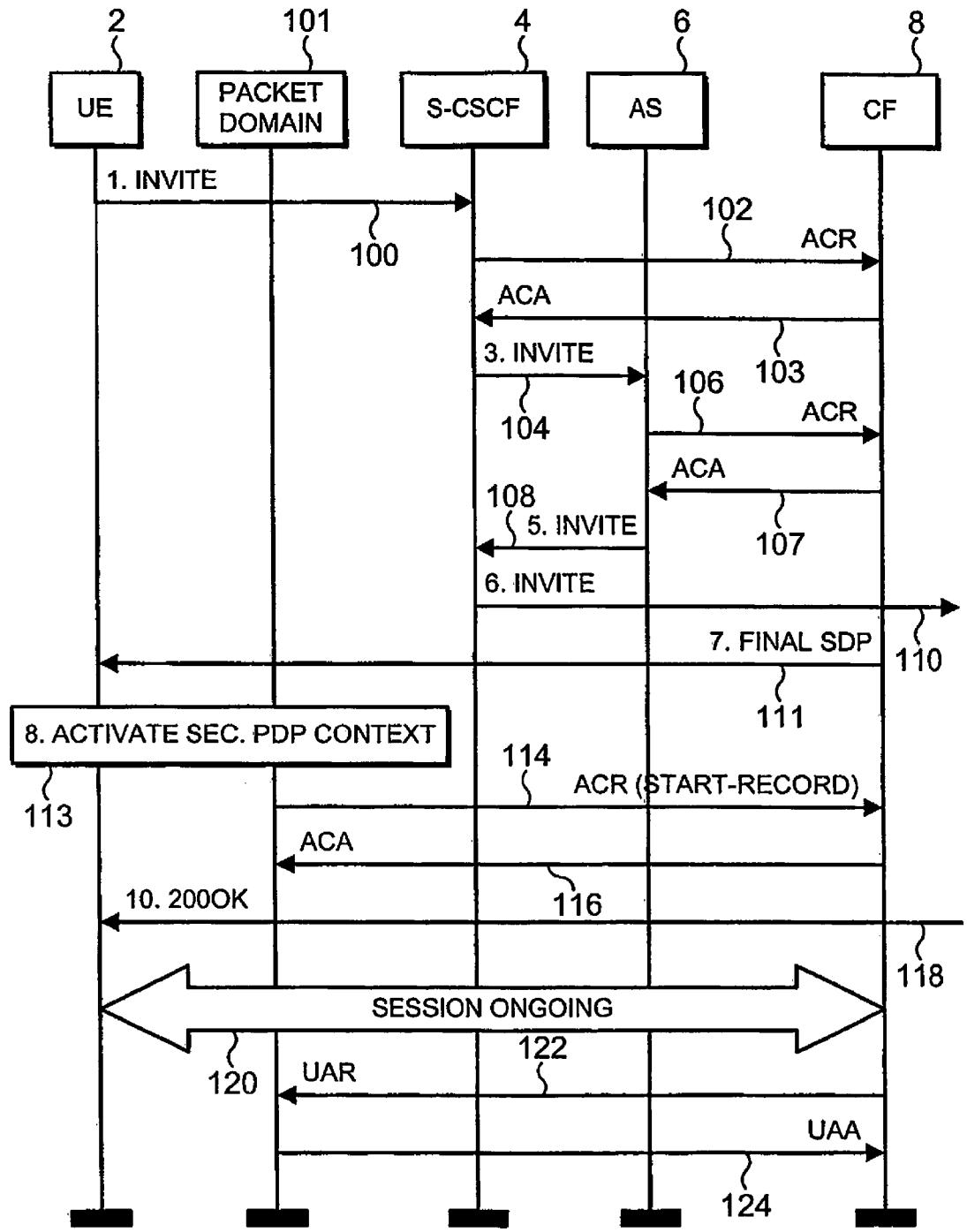
FIG. 2 illustrates the signaling in a preferred embodiment of the present invention.
Figure 3:
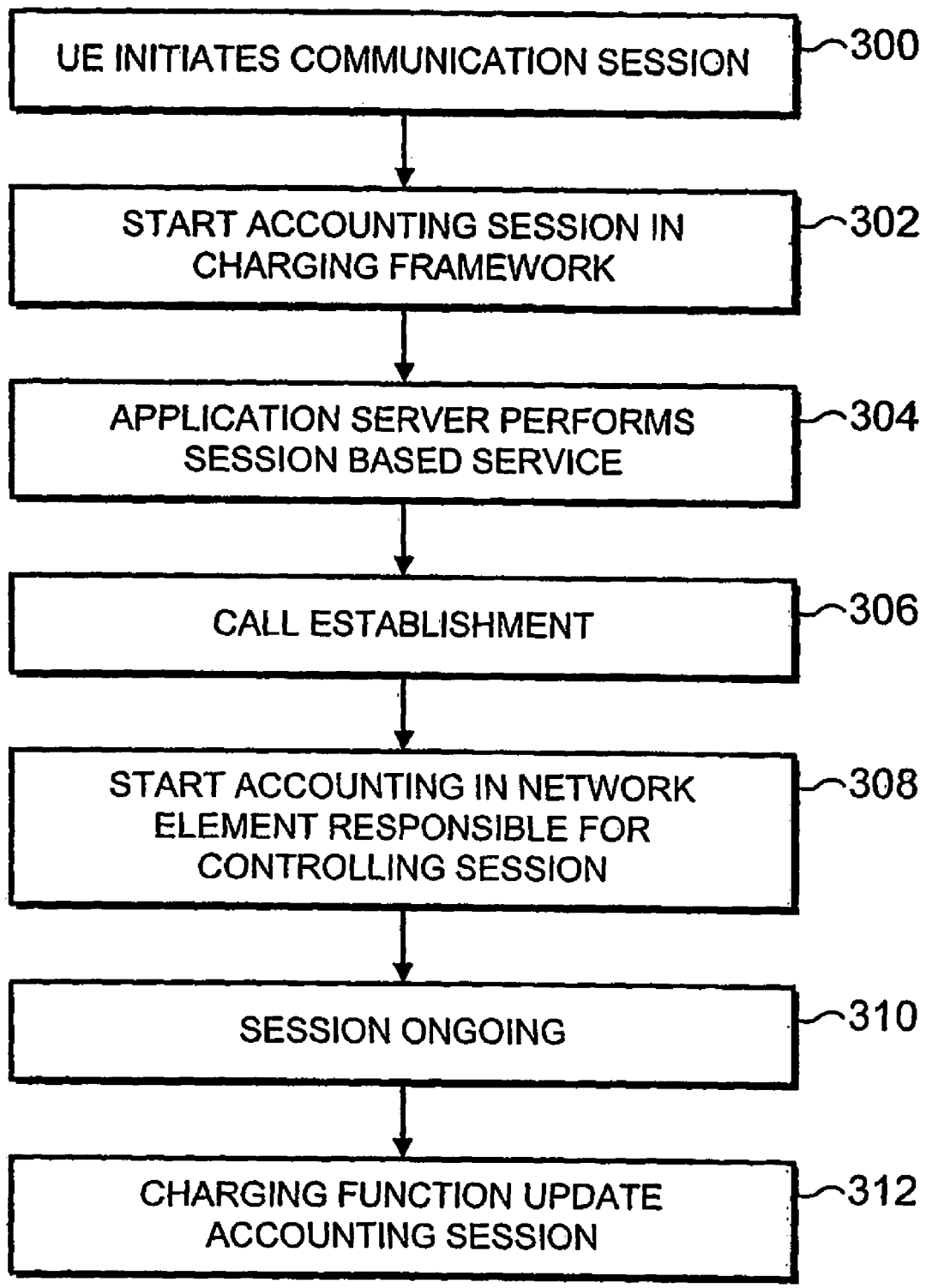
FIG. 3 is a flow chart illustrating the principle steps in implementing the preferred embodiment of FIG. 2.

Referring to FIGS. 2 and 3, an example embodiment of the present invention is now described.

In a first step, user equipment 2 transmits an INVITE message 100 in the packet domain—as represented by block 101—to the serving call state control function (S-CSCF) 4 allocated to the call session. In FIG. 2, the packet domain 101 represents the SGSN 3 and the GGSN 5. The communication of signals through the packet domain is well-known to one skilled in the art. The INVITE message represents the initiation of an active communication session by the UE 2, as represented by step 300 in FIG. 3, which requires an accounting session to be initiated to charge the session.

Responsive to the INVITE message, in the preferred embodiment an initial accounting is started by the S-CSCF 4. The S-CSCF sends an ACR(START_RECORD) accounting request message 102 to the CF 8. The CF 8 replies with an ACA accounting acknowledgement message 103. If the user equipment 2 is a pre-paid user, an initial threshold value is also sent to the S-CSCF 4 by the CF 8. The start of the accounting session is represented by step 302 in FIG. 3.

As such, a first accounting session is established with the charging function.

Following the start of the initial accounting, the S-CSCF 4 transmits an INVITE message 104 to the AS 6. Responsive to the INVITE message 104, the AS 6 preferably performs a session based service as represented by step 304 in FIG. 3. To perform the session based service, the AS 6 sends an accounting request ACR(START_RECORD) message 106 to the CF 8. Responsive thereto, the CF 8 replies with an ACA accounting acknowledgement message 107.

As such, a second accounting session is established with the charging function.

The session based service may be a one-time event, for example this ACR may include any sponsorship information, where the AS 6 confirms its identity and also that it will pay a percentage, or a predetermined fixed amount, of certain charges. For example, the AS 6 may inform the CF 8 that it intends to pay for 50% of the Call Control charges and 50% of the mobility management charges, as charged by the S-CSCF 4. The CF 8 stores this information, and then replies with the ACA accounting acknowledgement message 107.

Thereafter, the AS 6 returns an INVITE message 108 to the S-CSCF 4. The S-CSCF 4 then forwards an INVITE message 110 towards the terminating party (the B-subscriber 22), i.e. the recipient of the call session initiated by the user equipment 2.

Responsive to satisfactory acceptance of the call, in accordance with known techniques, the terminating party returns a positive acknowledgement message to the S-CSCF 4, which message may be a 200 OK message. Such message is not shown in FIG. 2, and will be familiar to one skilled in the art.

Thereafter, a final session data protocol (SDP) takes place between the CF 8 and the UE 2, as represented by message 111. A secondary PDP context then takes place in the packet domain, as represented by block 113. The secondary PDP context is well-known to one skilled in the art.

The transmission of the final SDP 111 and the activation of the second PDP context 113 complete the establishment of the call between Subscriber A (UE 2) and Subscriber B 22. This is represented in FIG. 3 by step 306.

Thereafter, an accounting session is initiated from the GGSN 5 in the packet domain 101, as represented by step 308. In this example the GGSN 5 is the network element (NE) responsible for controlling the session. In alternatives, the network element controlling the session may, for example, be an application server such as AS 6 or an IP multimedia subsystem (IMS).

The accounting session is initiated by the GGSN sending an ACT(START_RECORD) message 114 to the CF 8. The CF 8 replies with an ACA accounting acknowledgement message 116.

As such, a third accounting session is established with the charging function.

The ACA message 116 may include the new tariff. In a pre-paid user scenario, an initial threshold value is sent from the CF 8 to the GGSN 5.

Thereafter a 200 OK message 118 is transmitted through the network from the terminating network 18 to the UE 2, to indicate that the session could be established.

Thereafter, as represented by step 310 in FIG. 3 and communication 120 in FIG. 2, a communication session is ongoing in which the cost thereof is monitored by the CF 8.

Once the session is established and ongoing, in accordance with the present invention the CF 8 may dynamically change the charging capabilities of the session.

In the example of FIG. 2, at some time after the session has begun the CF 8 detects that after a certain time (e.g. after the session has been ongoing for one hour), the use of the packet domain is free for the particular application server being used. As such, the CF 8 sends a UAR (update-accounting-request) message 122 to the GGSN 5. The UAR message 122 indicates to the GGSN 5 that the accounting session is free of charge from this point onwards.

Responsive to the UAR message 122, the GGSN 5 returns a UAA (update-accounting-answer) message 124 to the CF 8, to acknowledge that the UAR message 122 has been received and acted on. The change to the charging capabilities of the network is indicated by step 312 in FIG. 3.

It should be noted that the update could be performed also towards the S-CSCF 4 and/or the AS 6.

Thus the present invention provides for the dynamic change of the accounting session on the initiation of the charging function, particularly in a network utilizing a Diameter protocol for charging.

The present invention particularly advantageously may be applied in prepaid charging scenarios. A charging function or framework may support pre-paid charging for GPRS or 3G access and for access to the IP multimedia subsystem (IMS). The invention allows the charging function or framework to inform the network element controlling the session if charging parameters are changed at some point in the session.

There are various different bases on which the charging parameters may be changed. For example the service provider may increase or decrease some part of the session charge at some stage during the session. This may be because the session has exceeded a certain length of time or cost, or the time of day is such that revised charging costs are in force. Possible alternatives for causing the charging function or framework to vary the cost of the charging session will be readily apparent to one skilled in the art.

The invention advantageously provides a mechanism for flexible and effective on-line charging in all-IP networks. As the CF is the only node which can combine independent accounting sessions related to the same session, the CF initiated updating mechanism offers an important service.

In the preferred embodiment, the invention provides for a new message pair in networks implementing charging using the Diameter protocol. The message pair comprises an updating accounting request (UAR) from the charging function or framework, and a corresponding update accounting answer (UAA) to the charging function or frame work. This enables the Diameter protocol to be effectively used for on-line charging in all-IP networks.

The need for such an ability for the charging function or charging framework to provide dynamic adjustment of the charging parameters is especially applicable in scenarios where accounting sessions have interaction. In such scenarios, one session may provide another with information about a change in its charging.

In the example of FIG. 2, for example, three accounting sessions are established, as represented by steps 302, 304 and 308.

The invention may preferably be utilized for on-line charging.

The present invention is described herein with reference to examples of preferred embodiments for the purpose of illustration, and is not limited to any such embodiments. The scope of the present invention is defined by the appended claims.

The invention claimed is:

1. A method, comprising: establishing an accounting session between a network element and a charging function for the session, wherein the network element comprises a gateway of an internet protocol based communication system; initiating a change in the accounting session on the initiation of the charging function; and charging for services in the communication system based on the accounting session, wherein the initiating a change in the accounting session occurs during an ongoing session and comprises detecting a change in charging for services by the charging function and transmitting a request to update the accounting session from the charging function to the network element, and wherein the initiated change comprises performing at least one of an increase and decrease in charges for services currently implemented in the ongoing session, wherein the transmitting the request comprises transmitting an update accounting request message.

2. The method according to claim 1, further comprising: responsive to the request, implementing, in the network element, a change in the charging of the accounting session.

3. The method according to claim 1, further comprising: responsive to the request, transmitting, by the network element, an acknowledgement to the charging function.

4. The method according to claim 3, wherein the transmitting the acknowledgement comprises transmitting an update accounting acknowledgement message.

5. The method according to claim 1, further comprising: configuring the network element using a controller of a communications session relating to the accounting session.

6. The method according to claim 1, wherein the establishing an accounting session comprises establishing an accounting session between the charging function and a further network element.

7. The method according to claim 6, further comprising:
establishing an accounting session between an application for the accounting session and the charging function.

8. The method according to claim 6, further comprising:
establishing an accounting session between a control function for the accounting session and the charging function.

9. The method according to claim 7, wherein the initiating the change in the accounting session between the network element controlling the session and the charging function is responsive to a change in at least one of the accounting session between the charging function and a further network element or the accounting session between an application for the accounting session and the charging function.

10. The method according to claim 1, further comprising:
associating the accounting session with a pre-paid charging function.

11. A method according to claim 1, further comprising:
configuring the internet protocol based communication system to support a diameter internet protocol.

12. A charging element, comprising: a monitor unit configured to monitor charging in an internet protocol based communication system; an establishment unit configured to establish an accounting session with an application; an information unit configured to inform a network element configured to control an associated communication session of the accounting session, wherein the network element comprises a gateway of the internet protocol based communication system; and an initiation unit configured to initiate a change in the accounting session, said change occurring during an ongoing session, wherein the initiation unit comprises a detector configured to detect a change in charging for services by the charging function and a transmission unit configured to transmit a request to update the accounting session, and wherein the change comprises performing at least one of an increase and decrease in charges for services currently implemented in the ongoing session, wherein the request comprises an update accounting request message.

13. The element according to claim 12, wherein the initiation unit is configured to implement a change in the charging of the accounting session responsive to the request.

14. The element according to claim 12, wherein the network element is configured to transmit an acknowledgement to the charging function responsive to the request.

15. The element according to claim 14, wherein the acknowledgement comprises an update accounting acknowledgement message.

16. The element according to claim 12, wherein the network element comprises a controller of the associated communications session.

17. The element according to claim 12, wherein the communication system is configured to support a diameter internet protocol.

18. The element according to claim 17, wherein the request is configured to be transmitted using a diameter internet protocol.

19. The element according to claim 17, wherein the element is configured, to transmit an acknowledgement to the charging function responsive to the request, wherein the acknowledgement is configured to be transmitted using a diameter internet protocol.

20. A communication system, comprising: a network element configured to control a session for the provision of services in an internet protocol based communication system, wherein the network element comprises a gateway of the internet protocol based communication system; an application for the session; a control function for the session; and a charging function, wherein at least one accounting session is configured to be established between the charging function and at least one of the network element, the application, or the control function, and wherein the charging function is configured to initiate a change in the at least one accounting session during an ongoing session by detecting a change in charging for services by the charging function and transmitting a request to update the accounting session to the network element, and wherein the initiated change comprises performing at least one of an increase and decrease in charges for services currently implemented in the ongoing session, wherein the request comprises an update accounting request message.

21. The communication system according to claim 20, wherein charging of the charging function comprises pre-paid charging.

22. The communication system according to claim 20, further comprising:
a plurality of accounting sessions, wherein the charging function initiates a change in one accounting session of the plurality of accounting sessions responsive to a change in another accounting session of the plurality of accounting sessions.

23. A charging element, comprising: monitor means for monitoring charging in an internet protocol based communication system; establishment means for establishing an accounting session with an application; information means for informing a network element configured to control an associated communication session of the accounting session, wherein the network element comprises a gateway of the internet protocol based communication system; and initiation means for initiating a change in the accounting session, said change occurring during an ongoing session, wherein the initiation means comprises detecting means for detecting a change in charging for services by the charging function and transmission means for transmitting a
request to update the accounting session, and wherein the change comprises performing at least one of an increase and decrease in charges for services currently implemented in the ongoing session, wherein the request comprises an update accounting request message.

24. A computer program embodied on a non-transitory computer readable medium, the computer program being configured to control a processor to perform: establishing an accounting session between a network element and a charging function for the session, wherein the network element comprises a gateway of an internet protocol based communication system; initiating a change in the accounting session on the initiation of the charging function; and charging for services in the communication system based on the accounting session, wherein the initiating a change in the accounting session occurs during an ongoing session and comprises detecting a change in charging for services by the charging function and transmitting a request to update the accounting session from the charging function to the network element, and wherein the initiated change comprises performing at least one of an increase and decrease in charges for services currently implemented in the ongoing session, wherein the request comprises an update accounting request message.

* * * * *